Oct. 27, 1925.
R. I. SHORT
REAR VIEW MIRROR
Filed June 1, 1922
1,558,641
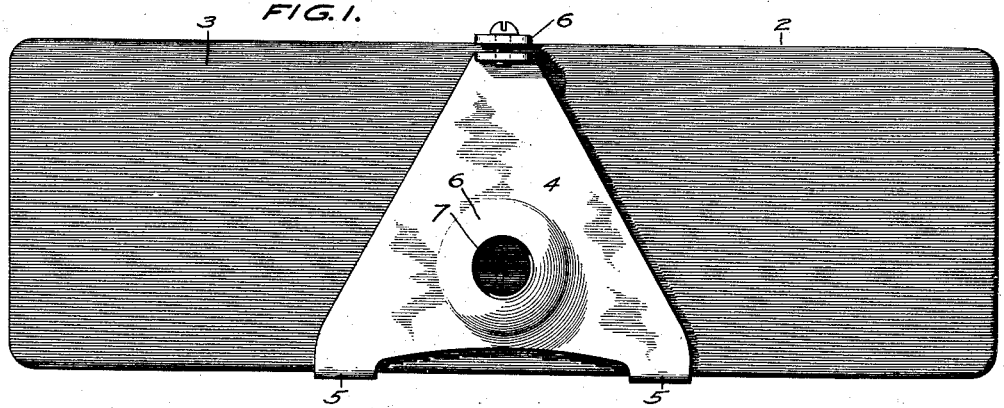
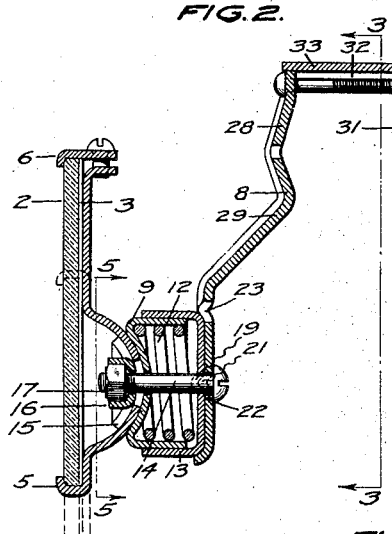
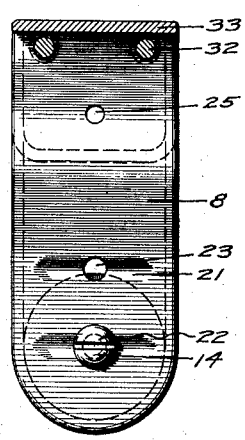
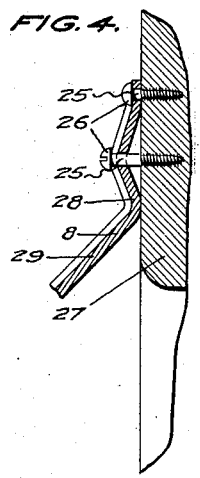
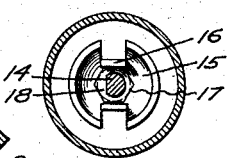
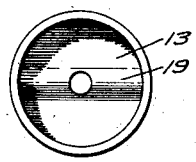
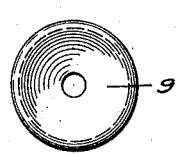
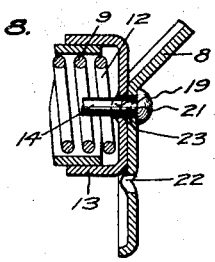
INVENTOR.
RUEL I. SHORT.
BY *White Prost Shaun*
his ATTORNEYS.

Patented Oct. 27, 1925.

1,558,641

UNITED STATES PATENT OFFICE.

RUEL I. SHORT, OF LOS ANGELES, CALIFORNIA.

REAR-VIEW MIRROR.

Application filed June 1, 1922. Serial No. 565,035.

*To all whom it may concern:*

Be it known that I, RUEL I. SHORT, a citizen of the United States, and a resident of Los Angeles, county of Los Angeles, and State of California, have invented a certain new and useful Rear-View Mirror, of which the following is a specification.

The invention relates to rear view mirrors for use on vehicles, particularly automobiles, to permit the driver to view the roadway behind him without turning his head to the rear.

An object of the invention is to provide an adjustable mounting for a rear view mirror to permit the mirror to be positioned in a plurality of vertically spaced positions.

Another object of the invention is to provide a rear view mirror mounting adapted for ready attachment to open and closed cars.

Another object of the invention is to provide an adjustable mounting which permits ready adjustment of the mirror without the use of tools and by which the mirror is held fixed in the adjusted position.

The invention possesses other advantageous features, some of which, with the foregoing, will be set forth at length in the following description, that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:—

Fig. 1 is a rear elevation of the mirror and its clamp.

Fig. 2 is a central vertical section through the mirror and its supporting bracket.

Fig. 3 is a sectional elevation of the bracket taken on the line 3—3, Fig. 2.

Fig. 4 is a fragmentary section of the bracket secured directly to the vehicle body.

Fig. 5 is a section taken on the line 5—5, Fig. 2.

Fig. 6 is an elevation of the cup member.

Fig. 7 is an elevation of the socket member.

Fig. 8 is a vertical section of a fragment of the mounting arranged in another adjusted position.

The present invention relates particularly to rear view mirrors which are mounted substantially directly in front of the driver of the automobile so that vision is obtained through the rear window or light in the top or body of the automobile in distinction to those mirrors which are mounted on the side of the car so that vision is obtained backward along the side of the car. The present mirror mounting is constructed so that it may be readily attached to the upper rail of the windshield in an open car or to the top strip above the windshield in a closed or fixed top car, this top strip being ordinarily formed of wood. In various cars, the height and position of the rear window or light varies, so that, in order that the reflected ray from the mirror through the rear window be not so steep as to strike the road a short distance behind the car and thus prevent a suitable rear view of the road, it is desirable to adjust the height of the rear view mirror, so that a desirable rear view is obtainable. In accordance with my invention, the mirror is adjustably mounted so that it may be positioned in a plurality of vertically spaced positions, thereby permitting desirable rear view vision.

The device of my invention comprises a mirror 2, of any desired shape, but preferably elongated, and having a protective covering 3 of paint or fabric on its back. The mirror is securely held in a frame 4 having spaced lips 5 engaging one edge and a clamp lip 6¹ engaging the other edge, the latter lip being adjustably attached to the frame. Formed on the frame and spaced vertically from the center of the mirror is an integral hemi-spherical protuberance or boss 6 having an aperture 7 formed centrally therein.

The mirror is supported by a bracket member 8 and interposed between the bracket and the boss 6 is a resilient friction connection which permits ready angular adjustment of the mirror with respect to the bracket. Frictionally engaging the outer surface of the boss 6 is a socket member 9 having a spheroidal concave face which is pressed against the face of the boss by a helical spring 12, bearing against the rear wall of the cup member 13, the side walls of which surround and position the socket member 9. The socket member telescopes within the cup-member so that they are capable of relative movement and the enclosed spring tends to press the two members apart. The cup member bears against the bracket 8 and the members are held in assembled position by a bolt 14 extending through aligned apertures in the bracket, cup, socket and boss, the aperture in the boss being sufficiently large to permit universal angular adjustment of the miror on the bracket. Disposed within the boss and engaging the inner concave surface thereof is a convex washer 15 through which the bolt 14 passes, the washer being provided with turned up lips 16 engaging the nut 17 to prevent rotation of the nut with respect to the washer. The washer is also prevented from rotating with respect to the bolt by forming the hole through the washer flat on one side and forming that portion of the bolt which engages in the washer, with a flat side 18. The nut is thus prevented from rotating with respect to the bolt, so that after assembly, the nut cannot become loosened and destroy the adjustment of the mounting. The cup member is prevented from rotating with respect to the bracket by providing it with an elongated depression 19, usually diametrically disposed, which engages a complementary projection 21 on the bracket, the projection preferably intersecting the bolt hole 22 in the bracket.

To permit vertical bodily adjustment of the mirror, the bracket is provided with a plurality of vertically spaced bolt holes 22 and 23 and the mounting assembly may be arranged on a bolt passing through the lower bolt hole 22, as shown in Fig. 2 or through the upper bolt hole 23, as shown in Fig. 8. When installed in closed cars, the mirror is preferably mounted as shown in Fig. 2, whereas on open cars, the arrangement shown in Fig. 8 may be preferred, since it raises the mirror to the top of the windshield. Further vertical adjustment of the mirror is obtained by rotating the mirror 180° on its mounting, which action, due to the offset position of the boss 6 with respect to the center line of the mirror, causes a vertical displacement of the mirror. In Fig. 2, I have shown in broken lines, the position of the mirror when rotated 180° from the full line position.

The bracket 8, which is preferably of shallow channel construction, to give it the necessary rigidity, is constructed so that it may be readily attached to the top rail of a windshield in an open car or to the wooden top sill in a closed car. The bracket is provided at its upper end with holes 25, through which screws 26 are passed to secure the bracket to the wood sill 27. At this attaching portion the bracket is preferably formed with a somewhat concave wall 28 to permit of a more secure attachment by the screws. Below the attaching area, the bracket inclines forwardly, as at 29, to position the mirror in spaced relation to the windshield and permit ready access to the bolt 14, should it be desired to change the vertical adjustment of the mirror.

The bracket is also formed so that it may be readily clamped to the top rail of a windshield, a concave clamp member 31 being employed for that purpose and cooperating with the concave attaching portion of the bracket to encircle and firmly clamp the windshield rail. The clamp 31 is drawn toward the bracket by screws 32 and the clamp is held in position and the screws prevented from bending by the top piece 33 of the clamp which lies against the top of the bracket.

I claim:—

1. A mirror mounting comprising a bracket, a rectangular mirror, a ball and socket joint connecting the bracket with the mirror at a point spaced from the horizontal center line of the mirror, a spring holding the ball and socket members of the joint in tight frictional contact, and means to permit vertical adjustment of the ball and socket joint on the bracket.

2. A mirror mounting comprising a bracket, a rectangular mirror adapted to be attached to said bracket at a plurality of vertically spaced points and a resilient frictional connection between the mirror and the bracket at a point spaced from the horizontal center line of the mirror whereby a half revolution of the mirror permits vertical displacement of the mirror on its bracket.

3. A mirror mounting comprising a bracket having a plurality of vertically spaced apertures therein, a rectangular mirror, a frame secured to said mirror, a resilient member interposed between bracket and mirror and a bolt extending through said frame, resilient member and one of said apertures, and a spring adapted to hold said resilient member and the mirror frame in tight frictional engagement.

4. A mirror mounting comprising a bracket having a plurality of vertically spaced apertures therein, a mirror, a frame secured to said mirror, a convex boss on said frame, a resilient member comprising a helical spring interposed between said frame and bracket and having a concave surface engaging said boss and a bolt extending through said boss, resilient member and one of said apertures.

5. A mirror mounting comprising a bracket having a plurality of vertically spaced apertures therein, a mirror, a frame secured to said mirror, a convex boss on said frame, a resilient member, composed of telescoping members enclosing a spring, interposed between said boss and bracket, said member having a concave surface engaging said boss and means for securing said resilient member to said bracket at optional vertically spaced points.

6. A mirror mounting comprising a bracket having a plurality of vertically spaced apertures therein, a mirror, a frame secured to said mirror, convex boss on said frame, a resilient member, composed of telescoping members enclosing a spring, interposed between said boss and bracket, said member having a concave surface engaging said boss, a bolt extending through said boss, resilient member and one of said apertures, a nut on said bolt disposed within said boss, a washer surrounding the bolt below the nut and means for preventing rotation of the nut with respect to the washer.

In testimony whereof, I have hereunto set my hand.

RUEL I. SHORT.